United States Patent
Rieder et al.

(10) Patent No.: US 12,228,441 B2
(45) Date of Patent: Feb. 18, 2025

(54) METHOD FOR MONITORING A CORIOLIS MASS FLOW METER

(71) Applicant: Endress+Hauser Flowtec AG, Reinach (CH)

(72) Inventors: Alfred Rieder, Landshut (DE); Hao Zhu, Freising (DE)

(73) Assignee: Endress+Hauser Flowtec AG, Reinach (CH)

( * ) Notice: Subject to any disclaimer, the term of this patent is extended or adjusted under 35 U.S.C. 154(b) by 329 days.

(21) Appl. No.: 17/996,800

(22) PCT Filed: Mar. 23, 2021

(86) PCT No.: PCT/EP2021/057464
§ 371 (c)(1),
(2) Date: Oct. 21, 2022

(87) PCT Pub. No.: WO2021/213765
PCT Pub. Date: Oct. 28, 2021

(65) Prior Publication Data
US 2023/0184573 A1     Jun. 15, 2023

(30) Foreign Application Priority Data
Apr. 23, 2020 (DE) .................. 10 2020 111 127.4

(51) Int. Cl.
*G01F 1/84* (2006.01)
(52) U.S. Cl.
CPC .................. *G01F 1/8436* (2013.01)

(58) Field of Classification Search
CPC ........ G01F 1/8436; G01F 1/84; G01F 1/8459; G01F 25/10; G01F 25/0084; G01F 25/0092; G01F 25/15; G01F 25/20
See application file for complete search history.

(56) References Cited

U.S. PATENT DOCUMENTS

| 5,907,104 A | 5/1999 | Cage et al. |
| 5,926,096 A | 7/1999 | Mattar et al. |

(Continued)

FOREIGN PATENT DOCUMENTS

| DE | 10356383 A1 | 6/2005 |
| DE | 102009002941 A1 | 11/2010 |

(Continued)

*Primary Examiner* — Suman K Nath
(74) *Attorney, Agent, or Firm* — Christopher R. Powers; Endress+Hauser (USA) Holding, Inc.

(57) ABSTRACT

The present disclosure relates to a method used to monitor a Coriolis mass flow meter, which has an oscillator with at least one measurement tube, the method including: exciting the oscillator so as to cause flexural vibrations of a first antisymmetric vibration mode by an excitation signal at a resonance frequency of the first antisymmetric vibration mode; sensing a vibration amplitude of the first antisymmetric vibration mode at the resonance frequency of the first antisymmetric vibration mode; sensing a time constant of the decaying free vibrations of the first antisymmetric vibration mode; and determining a modal elastic property of the oscillator with respect to the first antisymmetric vibration mode on the basis of the vibration amplitude of the first antisymmetric vibration mode, the excitation signal, and the time constant.

15 Claims, 3 Drawing Sheets

(56) References Cited

U.S. PATENT DOCUMENTS

| | | | |
|---|---|---|---|
| 2011/0178738 A1 | 7/2011 | Rensing et al. | |
| 2018/0058893 A1* | 3/2018 | Drahm | G01F 1/8413 |
| 2019/0316944 A1* | 10/2019 | Keeney-Ritchie | G01F 1/8431 |
| 2019/0383658 A1* | 12/2019 | Zhu | G01F 1/8477 |

FOREIGN PATENT DOCUMENTS

| | | |
|---|---|---|
| DE | 102019124709 A1 | 3/2021 |
| WO | 2012062551 A1 | 5/2012 |
| WO | 2018101920 A1 | 6/2018 |
| WO | 2020036584 A1 | 2/2020 |

\* cited by examiner

METHOD FOR MONITORING A CORIOLIS MASS FLOW METER

CROSS-REFERENCE TO RELATED APPLICATIONS

The present application is related to and claims the priority benefit of German Patent Application No. 10 2020 111 127.4, filed on Apr. 23, 2020, and International Patent Application No. PCT/EP2021/057464, filed Mar. 23, 2021, the entire contents of which are incorporated herein by reference.

TECHNICAL FIELD

The present invention relates to a method for monitoring a Coriolis mass flow meter which has an oscillator with at least one measurement tube.

BACKGROUND

The elastic properties of the measurement tubes of Coriolis mass flow meters are negatively affected by corrosive and abrasive media, which erode the measurement tubes on their inner wall. There is therefore great interest in being able to determine and monitor the calibration or the calibration factor of Coriolis mass flow meters in running operation. To this end, there are some solutions which determine a flexibility of the measurement tubes as a measure of the calibration factor, which solutions are described in the publications WO 2018 920 A1, WO 2012 062551 A1, and the still unpublished patent application DE 10 2019 124 709.8. For the sake of simplicity, where flexibility is discussed below, the stiffness is always correspondingly encompassed. Common to the mentioned solutions is that they do not differentiate between specific modal flexibilities, but rather determine a flexibility which corresponds to a modal flexibility of a useful mode or drive mode. However, the measuring effect is determined by the deformation of the measurement tubes as a result of the Coriolis forces. This deformation correlates with the modal flexibility of the Coriolis modes, which have a symmetry oppositional to the useful mode or drive mode. Therefore, if the useful mode or drive mode is symmetrical with respect to a transverse plane of the measurement tube, then the Coriolis mode is antisymmetric. Accordingly, a variation in the modal flexibility of the Coriolis mode can be deduced only conditionally from a variation in the modal flexibility of the useful mode or drive mode. This is reasonable when the erosion of the tube wall is homogeneous, for example as can occur as a result of corrosion, since, in the event of homogeneous corrosion, the modal flexibilities of drive mode and Coriolis modes correlate very well. An abrasive erosion is not homogeneous, especially given curved measurement tubes, such that correlations dependent on the type of abrasion and the nominal width of the measurement tubes can be observed.

SUMMARY

It is therefore the object of the present invention to provide a method which enables a reliable monitoring of the meter independently of the type of wear and independently of the nominal width of the meter.

The object of the invention is achieved by the methods of the present disclosure.

The method according to the invention serves to monitor a Coriolis mass flow meter which has an oscillator with at least one measurement tube, wherein the method comprises:
exciting the oscillator so as to cause flexural vibrations of a first antisymmetric vibration mode by means of an excitation signal at a resonance frequency of the one first antisymmetric vibration mode;
sensing a vibration amplitude of the first antisymmetric vibration mode at the resonance frequency of the first antisymmetric vibration mode;
sensing a time constant of the decaying free vibrations of the first antisymmetric vibration mode; and
determining a modal elastic property of the oscillator with respect to the first antisymmetric vibration mode on the basis of the vibration amplitude of the first antisymmetric vibration mode, the excitation signal, and the time constants.

The excitation of a vibration mode at its resonance frequency leads to a quality-dependent resonance exaggeration, given the typical qualities Q of the oscillator. On the one hand, this is advantageous because this provides the basis for obtaining a usable signal of antisymmetric vibration modes at all if the exciter, although it is distanced in the longitudinal direction of the measurement tube, is still positioned close to a vibration node of the first antisymmetric vibration mode. On the other hand, no conclusion about the modal stiffness of the vibration mode can be drawn without knowing the quality of the amplitude.

In a development of the invention, the exciter is only somewhat offset from the center in the longitudinal direction, relative to the measurement tube length, thus is always still positioned close to a vibration node of the first antisymmetric vibration mode. A suitable position for the exciter is, for example, offset by 2.5% of the measurement tube length from the center of the measurement tube. In order to apply the method according to the invention, precautions should be taken that the exciter be arranged offset, for example by at least 0.5%, especially not less than 1%, of the measurement tube length from the center of the measurement tube. Upon the excitation of the oscillator with an eigenfrequency of a symmetric drive mode, especially the f1 mode, an asymmetric mounting of the exciter produces a phase difference between the vibrations of the two vibration sensors, which can result in a zero point error in the flow measurement if this effect is not taken into account and compensated. It is therefore advantageous if the symmetry breaking due to the asymmetric mounting remains limited. The exciter is, for example, therefore offset not more than 5% of the measurement tube length in the longitudinal direction relative to the center of the measurement tube.

In a development of the invention, a modal quality is initially determined on the basis of the time constants, wherein the determination of the modal elastic property of the oscillator then takes place on the basis of the vibration amplitude, the excitation signal, and the quality, wherein the resonance frequency of the considered vibration mode can furthermore be included in the determination of the quality.

In a development of the invention, the resonance frequency of the oscillator is furthermore included in the determination of the modal elastic property of the oscillator.

In a development of the invention, the variation of the modal elastic property of the oscillator is established by comparison with at least one reference value of the modal stiffness.

In a development of the invention, the mass flow meter is characterized by a calibration factor (calf), which is used to determine a mass flow measurement value which is proportional to the calibration factor and to a time difference between in-phase points of the signals of two vibration sensors of the meter, wherein the method according to the development of the invention furthermore comprises: adapting the calibration factor calf depending on a variation in the modal elastic property of the oscillator.

In a development of the invention, the method furthermore comprises: sensing a series of values of the modal elastic property; and determining a trend for the modal elastic property or a trend for the calibration factor calf.

In a development of the invention, the method furthermore comprises: determining a time period in which the modal elastic property or the calibration factor calf still lie within a permissible value range; and signaling the time period, or outputting an alarm signal, if the period of time falls below a limit value, wherein the time period is especially not less than one week, for example not less than one month, and furthermore, for example, not less than a quarter.

In a development of the invention, the method furthermore comprises: determining the modal elastic property of at least one further vibration mode; calculating a current relationship between the modal elastic property of the first antisymmetric vibration mode and the modal elastic property of the further vibration mode.

In a development of the invention, the method furthermore comprises: evaluating the current relationship between the modal elastic property of the first antisymmetric vibration mode and the modal elastic property of the further vibration mode.

In a development of the invention, the method furthermore comprises: determining the extent and type of a wear of the at least one measurement tube of the oscillator on the basis of the relationship between the modal elastic property of the first antisymmetric vibration mode and the modal elastic property of the further vibration mode.

In a development of the invention, the modal elastic property comprises the modal flexural stiffness or the modal flexibility of the oscillator.

In a development of the invention, the at least one further vibration mode comprises the first symmetric flexural vibration mode and/or the second symmetric flexural vibration mode.

BRIEF DESCRIPTION OF THE DRAWINGS

The invention is now explained in more detail on the basis of the exemplary embodiments shown in Figures.

The following are shown:

FIG. 1b shows a schematic representation of electromechanical transducers of the exemplary embodiment of the Coriolis mass flow meter from FIG. 1a;

DETAILED DESCRIPTION

Figure 1A:
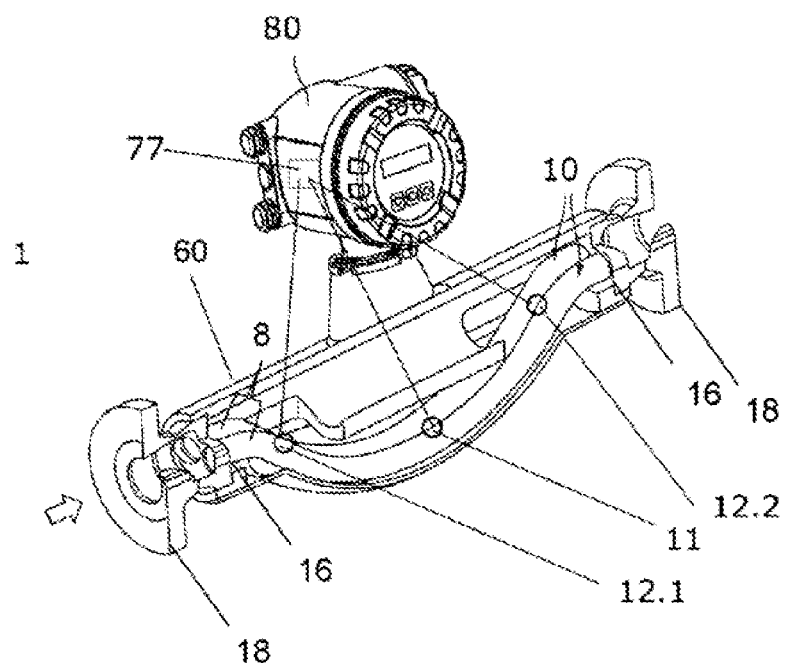
FIG. 1a shows a schematic representation of an exemplary embodiment of a Coriolis mass flow meter for implementing the method according to the present disclosure.

The Coriolis mass flow meter 1 shown in FIG. 1a comprises an oscillator 8 with curved measurement tubes 10 traveling substantially in parallel, as well as an exciter 11 which acts between the measurement tubes 10 in the direction of flow in order to excite them so as to excite these to flexural vibrations counter to one another. The exciter 11 is arranged offset, in the longitudinal direction of the measurement tubes, by approximately 2.5% of the length L of the measurement tubes relative to the center of the measurement tubes. Upon excitation of the oscillator with the exciter 11, a sufficient asymmetric force therefore acts in order to excite the first antisymmetric vibration mode, what is known as the f2 mode or first Coriolis mode, to resonant vibrations if the excitation of the oscillator takes place with a resonance frequency of the first antisymmetric vibration mode. Furthermore, the Coriolis mass flow meter 1 has two vibration sensors 12.1, 12.2, which are arranged symmetrically in the longitudinal direction relative to the center of the measurement tubes 10 in order to detect the relative movement of the measurement tubes 10 vibrating counter to one another. The measurement tubes 10 extend between two flow dividers 16, which fluidically combine the measurement tubes 10 and are respectively connected to a flange 18, which serves for the installation of the Coriolis mass flow meter 1 in a pipeline. A rigid support tube 60 which connects the flow dividers to one another extends between said flow dividers 16 in order to suppress vibrations of the flow dividers 16 counter to one another in the frequency range of the flexural vibration modes of the measurement tubes 10 counter to one another. The support tube can furthermore carry an electronics housing 80 in which a measuring and operating circuit 77 is contained which is configured to operate the meter and to implement the method according to the invention.

Figure 1B:
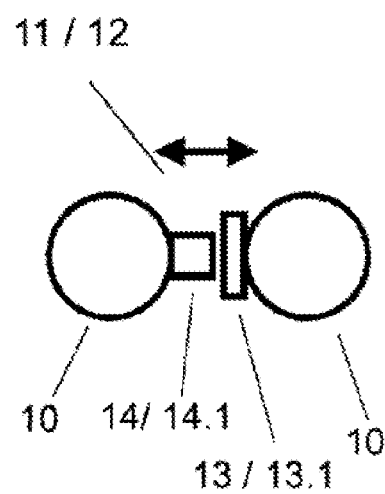

As shown in FIG. 1b, the exciter 11 and the vibration sensors 12 are especially designed as electrodynamic transducers that respectively have an excitation magnet 14 or sensor magnet 14.1, respectively, and an excitation coil 13 or sensor coil 13.1, respectively, which are mechanically connected opposite one another to one of the measurement tubes 10. The excitation coil 13 is configured to be supplied by the operating circuit 77 with an alternating current whose frequency corresponds to the instantaneous eigenfrequency of a flexural vibration mode to be excited. The resulting magnetic field alternately effects an attractive and repulsive force on the excitation magnet 14, whereby the measurement tubes 10 are set into vibration counter to one another. Accordingly, the relative movements of the sensor magnets 14.1 vibrating with the measurement tubes 10 relative to the sensor coils 13.1 induce a voltage in the sensor coils 13.1, which depends especially on the relative velocity of the measurement tubes relative to each other. The measuring and operating circuit 77 is configured to sense and evaluate the induced voltages in order to determine therefrom the relative velocities or the deflection of the vibration sensors 12.1, 12.2 or of the measurement tubes 10, a modal deflection of the measurement tubes 10 for different vibration modes.

Figure 2:
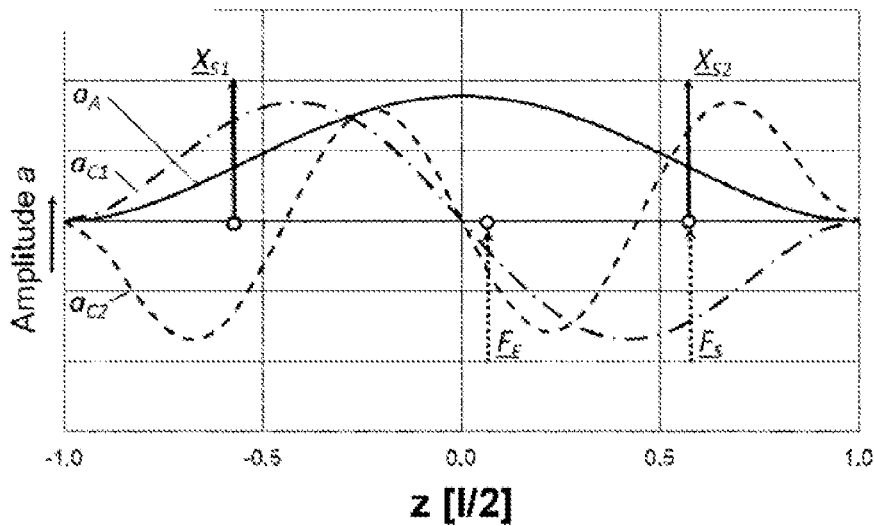
FIG. 2 shows a diagram of the vibration modes of a Coriolis mass flow meter.

The mode-dependent deflection of a measurement tube is shown schematically in FIG. 2. The curve $a_A$ hereby shows the bending line of a measurement tube for the first symmetric vibration mode, which is also called the drive mode or f1 mode. The curve $a_{c1}$ shows the bending line of the measurement tube for the first Coriolis mode or the first antisymmetric vibration mode, in which the measurement tube is deflected by the Coriolis forces if a mass flow flows through the measurement tube vibrating with the first symmetric vibration mode. The first antisymmetric vibration mode has a vibration node in the tube center at $z=0$ in the longitudinal direction of the measurement tube. An exciter at this position would not be able to excite a vibration of the first antisymmetric vibration mode. Therefore, here the exciter is offset from the center by approximately 2.5% of the measurement tube length, i.e., approximately 5% of half the measurement tube length. The measurement tube length is hereby the length of a measurement tube center line, following the curved course of a measurement tube, between the inlet-side and outlet-side flow dividers 16 in which the measurement tubes 10 are fixed by their ends. In the offset position, the exciter can excite the first antisymmetric vibration mode if it impresses an excitation force $F_E$ at the resonance frequency of the first antisymmetric vibration mode.

The positions of the vibration sensors are selected symmetrically in the longitudinal direction with respect to the measurement tube center of the measurement tubes, such that the deflections $X_{s1}$, $X_{s2}$ of the vibration sensors produce a sufficient measurement signal given both vibrations in the drive mode and the first antisymmetric vibration mode. Furthermore, shown in FIG. 2 is the bending line $a_{c2}$ for the second antisymmetric vibration mode or the second Coriolis mode in which the measurement tube is deflected if the measurement tube through which a mass flow passes vibrates in the second symmetric drive mode (not shown here), the f3 mode. Similarly, the second Coriolis mode can be excited if the exciter impresses an excitation force $F_E$ at the resonance frequency of the second Coriolis mode.

Due to the high modal quality Q of between 1000 and 10000, for example, the amplitudes of the vibration modes of the oscillator or of its measurement tubes exhibit a strong resonance exaggeration. In order to be able to infer the modal stiffness or flexibility of the individual modes, the modal quality Q is also to be determined in addition to the vibration amplitudes at the respective resonance frequencies. For this purpose, especially a decay curve of the respective vibration mode can be sensed after the excitation force has been switched off. The vibration amplitude normalized with the quality Q and the excitation force $F_E$ is a measure of the modal flexibility.

The modal flexibility of the first antisymmetric vibration mode impresses a calibration factor calf which, in a first approximation, is inversely proportional to this modal flexibility, and which relates the mass flow rate dm/dt to a time delay Δt between zero crossings of the two vibration sensors, i.e.:

$$dm/dt = \text{calf} \cdot \Delta t$$

A monitoring of the modal flexibility of the first antisymmetric vibration mode with the method according to the invention thus directly enables monitoring and correction of the calibration factor calf, or a validation of the mass flow measurement value dm/dt.

Figure 3:
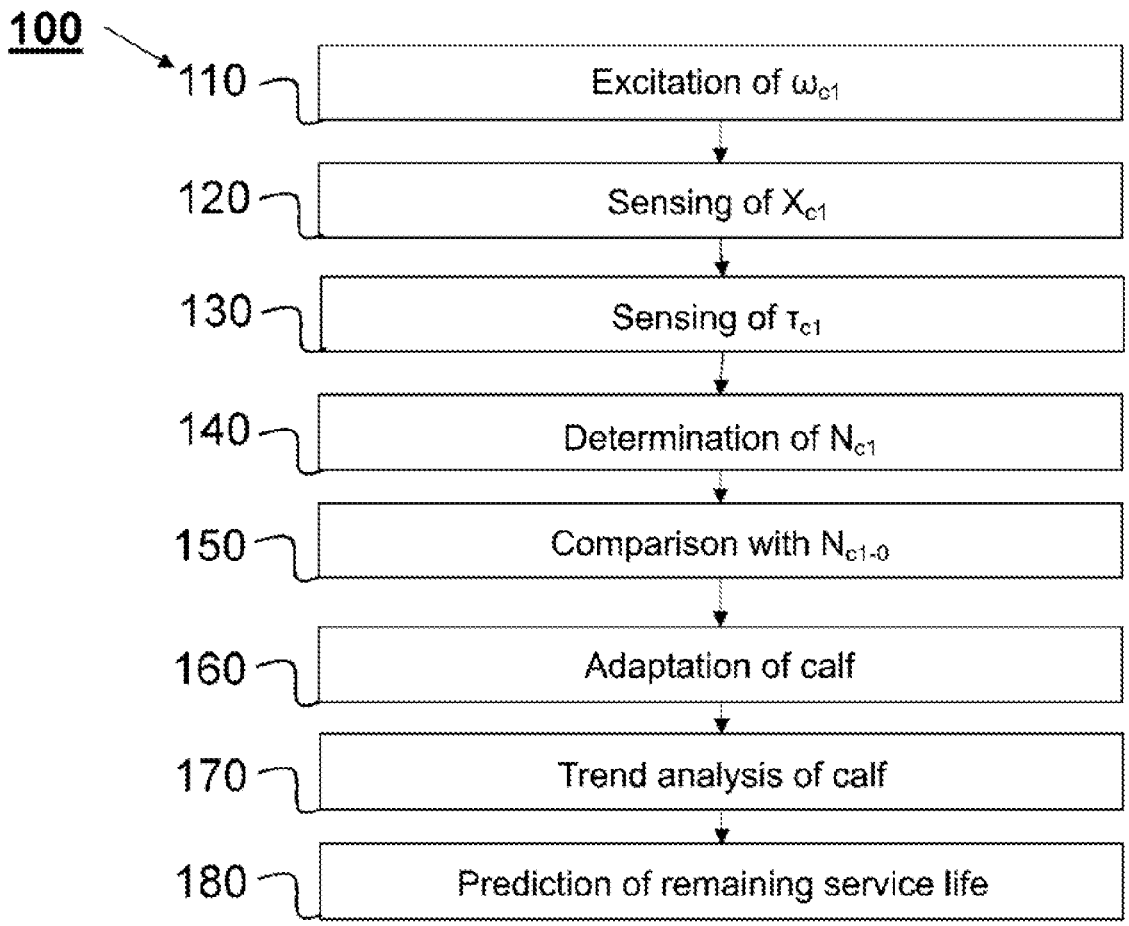
FIG. 3 shows a flow chart of a first exemplary embodiment of the method according to the present disclosure.

The method steps according to a first exemplary embodiment 100 of the method according to the invention are explained using FIG. 3. The method 100 can, for example, be implemented continuously, periodically, or in an event-controlled manner, wherein a triggering event can be, for example, a user request or the determination of a change in another monitoring variable of the measuring device.

The method 100 begins with the excitation 110 of the oscillator to flexural vibrations of a first antisymmetric vibration mode with a modal excitation signal $F_{e1}$ at a resonance frequency $\omega_{c1}$ of the first antisymmetric vibration mode. This first antisymmetric vibration mode is the first Coriolis mode or f2 mode, as explained in conjunction with FIG. 2.

In the steady state of this first antisymmetric vibration mode, the sensing 120 of the vibration amplitude $Xc_1$ of the first antisymmetric vibration mode takes place at its resonance frequency. For this purpose, the velocity-proportional induction voltage of the electrodynamic vibration sensors is evaluated at the resonance frequency of the first antisymmetric vibration mode.

This is followed by the sensing 130 of a time constant $\tau_{c1}$ of the decaying free vibrations of the first antisymmetric vibration mode, for which purpose the excitation signal at the resonance frequency of the first antisymmetric vibration mode is partially or completely switched off, and the decaying induction voltage amplitudes of the vibration sensors are sensed at the resonance frequency.

Finally, the determination 140 of a modal elastic property of the oscillator with respect to the first antisymmetric vibration mode takes place on the basis of its vibration amplitude, the excitation signal, and the time constants. For this purpose, for example, a modal quality $Q_{c1}$ can initially be determined on the basis of the time constants. The modal quality $Q_{c1}$ can, for example, be determined as follows:

$$Q_{c1} = \frac{\tau_{c1} \omega_{c1}}{2},$$

where $\omega_{c1}$ is the resonance frequency of the considered vibration mode.

The determination of the modal elastic property of the oscillator then takes place on the basis of the vibration amplitude, the excitation signal, and the modal quality.

The modal elastic property can be, for example, the modal flexibility $N_{c1}$, which is proportional to the modal vibration amplitude $X_{c1}$ divided by the modal quality $Q_{c1}$ and the amplitude of the modal excitation signal $F_{c1}$, i.e.:
$N_{c1} = K_{c1} \cdot X_{c1} / (F_{c1} \cdot Q_{c1})$, where $K_{c1}$ is a mode-specific constant.

By comparison 150 of the modal flexibility $N_{o1}$ determined in this way with a reference value $N_{c1-0}$, a variation in the modal elastic property of the oscillator can be determined, wherein the reference value represents, for example, the state upon startup of the mass flow meter.

As mentioned above, the calibration factor calf of the mass flow meter is substantially inversely proportional to the modal flexibility $N_{c1}$. In this respect, the calibration factor calf is also available as an elastic property to be monitored of the first antisymmetric vibration mode, wherein the calibration factor calf can be determined as follows: calf=$K_{calf}/N_{c1}$, where $K_{calf}$ is a device-specific proportionality factor.

The adaptation 160 of the calibration factor calf depending on a variation in the modal flexibility $N_{c1}$ furthermore enables precise mass flow measurements even given wear of the measurement tubes. After repeated adaptation of the calibration factor given modified modal flexibilities $N_{c1}$, a trend analysis 170 of the calibration factor calf can furthermore take place, and a prediction of remaining service life 180 can be provided, relating to the point in time up to which the meter can still be operated, assuming the same media properties. Details in this regard are explained further below in conjunction with FIG. 4.

Figure 4:
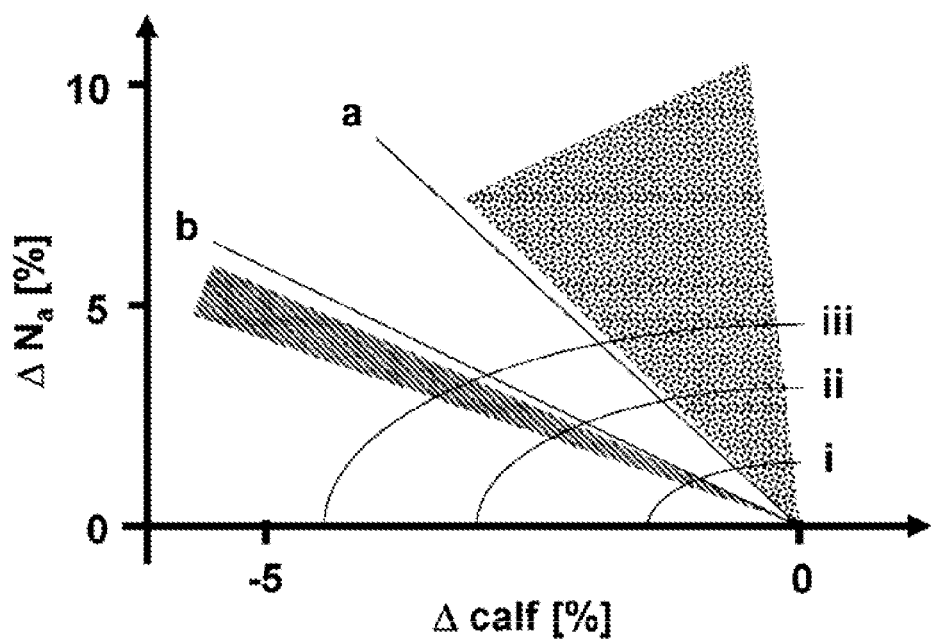
FIG. 4 shows a diagram of the relationship between variations of the calibration factor and the modal flexibility of the drive mode.
Figure 5:
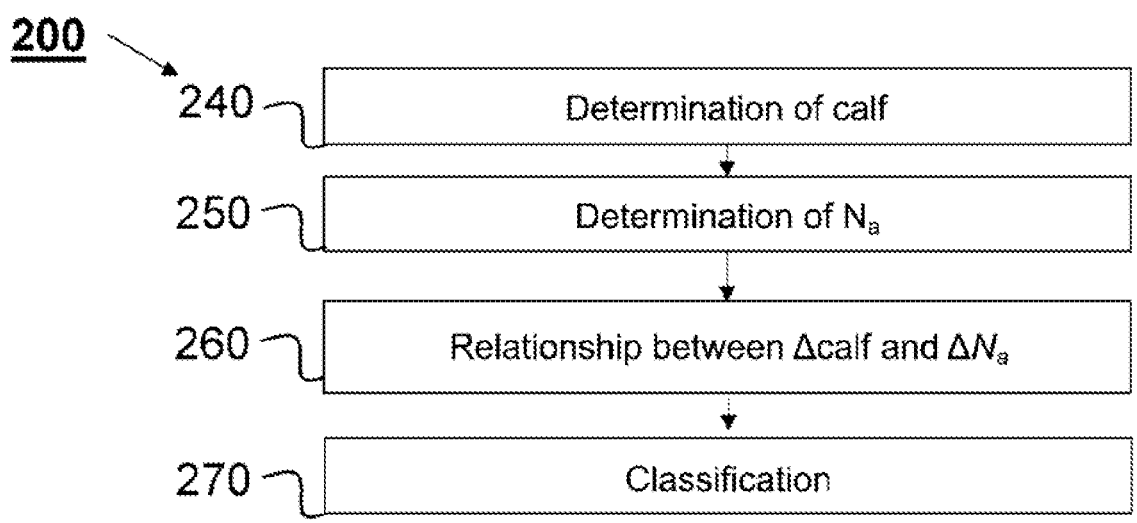
FIG. 5 shows a flow chart of a second exemplary embodiment of the method according to the present disclosure.

In addition, the method according to the invention can advantageously be combined with the method for monitoring the state of measurement tubes according to the international publication WO 2012 062551 A1, which teaches the monitoring of the modal flexibility $N_a$ of the first symmetric drive mode. This can especially be determined independently of quality via excitation outside of resonance. The relative deviation $\Delta N_a$ of a current modal flexibility $N_a$ of the first symmetric drive mode from a reference state $N_{a\text{-}0}$, for example in the brand-new state or after a certification, is likewise an indicator of a variation in the measurement tube. FIG. 4 relates the relative deviation $\Delta N_a$ of the modal flexibility of the first symmetric drive mode to the relative deviation $\Delta_{calf}$ of the calibration factor. Test series have yielded that, depending on the cause of the variation in the measurement tubes, two separate regimes occur for the relationship of the two monitoring variables $\Delta_{calf}$ and $\Delta N_a$. Both regimes have the common starting point of a measurement tube in the reference state at (0,0). In the event of corrosion, the wall of a measurement tube is substantially uniformly attacked, such that the moments of inertia of all measurement tube cross sections change uniformly. Accordingly, the modal stiffnesses of the relevant vibration modes are affected uniformly so that, given corrosion, a very good correlation is to be observed between $\Delta_{calf}$ and $\Delta N_a$. This corrosion regime is shown cross-hatched below the line b in FIG. 4. By contrast, given abrasion another picture emerges. Abrasion usually arises in heterogeneous media that comprise a liquid with a solid load. Depending on the Reynolds number, concentration, density distribution, and size distribution, different spatial distributions of the abrasion can occur, wherein, during its genesis, linear trajectories within the region shown in dotted lines in FIG. 4 above the line a in FIG. 4 were observed in a first approximation for the monitoring variables $\Delta_{calf}$ and $\Delta N_a$. Since the two regimes are distinctly separate from one another, a plant operator is thus provided with a means to recognize abrasion and corrosion processes in the measuring device at an early stage, and to identify the type of material erosion, on the basis of the relationship of $\Delta_{calf}$ and $\Delta N_a$. Thus, if a pair of values ($\Delta_{calf}$, $\Delta N_a$) is above the line a, abrasion is to be assumed, whereas if it is below the line b, this indicates corrosion. FIG. 5 shows a flow chart of a second exemplary embodiment 200 of a method according to the invention which realizes this aspect of the invention.

The first method steps proceed analogous to the first exemplary embodiment, up to the determination 240 of the calibration factor calf on the basis of the amplitude $Xc_1$ of the first antisymmetric vibration mode, its decay time $\tau_{c1}$, and the associated excitation signal $F_{c1}$ at the resonance frequency $\omega_{cf}$. The determination 250 of the modal flexibility $N_a$ of the first symmetric vibration mode takes place in parallel with this. This can take place analogously to the determination of the modal flexibility in the first exemplary embodiment in resonance, or independently of quality with excitation outside of resonance, as described in WO 2012 062551 A1. In fact, the measurements for determining the calibration factor calf and the modal flexibility $N_a$ of the first symmetric vibration mode can take place simultaneously, since the vibrations can be excited in a superposed manner. If current values for the calibration factor calf and the modal flexibility $N_a$ are obtained, the formation 260 of a relationship between the relative deviations $\Delta_{calf}$ and $\Delta N_a$ takes place from their respective reference values, wherein the relative deviations of a variable x are determined in accordance with $\Delta x = (x - x_{ref})/x_{ref}$, where x is the calibration factor calf or the modal flexibility $N_a$, and where $x_{ref}$ refers to the state of the respective variables upon startup of the meter. The evaluation 270 of the relationship then takes place in the form of a classification, wherein it is determined whether the relationship indicates a corrosion or abrasion. A classification can only be reliably implemented when the determined wear has already reached a certain extent, for example if the value pairs in the illustration of FIG. 4 lie outside the inner elliptical arc i. Using the duration which requires a trajectory of the value pairs from the inner elliptical arc i to the middle elliptical arc ii, it can then be extrapolated when the value pairs reach a critical wear limit, which is represented by, for example, the outer elliptical arc iii. This point in time can be provided as a notice to plan a maintenance measure. Moreover, an alarm can be generated if the time until reaching the critical wear limit falls below a limit value of, for example, a quarter and/or a month.

In the exemplary embodiments, the modal elastic property of the oscillator was described as the modal flexibility of the oscillator or the measurement tubes. Of course, the modal flexural stiffness or the calibration factor calf can similarly be used to model or describe the wear.

In addition to the first symmetric flexural vibration mode, the second symmetric flexural vibration mode, which is also referred to as an f3 mode, can also be used as a further mode.

The invention claimed is:

1. A method for monitoring a Coriolis mass flow meter, the flow meter comprising an oscillator including at least one measurement tube, an exciter and two oscillation sensors, the method comprising:
   exciting the oscillator using the exciter as to cause flexural vibrations of a first antisymmetric vibration mode in response to an excitation signal applied to the oscillator at a resonance frequency of the first antisymmetric vibration mode
   wherein the exciter is offset from a center of the at least one measurement tube in a longitudinal direction, and
   wherein the exciter is offset not more than 5% of a measurement tube length in the longitudinal direction relative to the center of the at least one measurement tube such that symmetry breaking caused by an asymmetric mounting of that exciter is limited, which symmetry breaking causes a phase difference between vibrations of the two oscillation sensors upon excitation of the oscillator with an eigenfrequency of a symmetric drive mode;
   sensing a vibration amplitude of the first antisymmetric vibration mode at the resonance frequency of the first antisymmetric vibration mode;
   sensing a time constant of the decaying free vibrations of the first antisymmetric vibration mode; and
   determining a modal elastic property of the oscillator with respect to the first antisymmetric vibration mode based on the vibration amplitude of the first antisymmetric vibration mode, the excitation signal and the time constant.

2. The method of claim 1, wherein the exciter is offset by at least 0.5% of the measurement tube length.

3. The method of claim 1, wherein the exciter is offset by at least 1% of the measurement tube length.

4. The method of claim 1, further comprising determining a modal quality of the oscillator based on the time constant, wherein the determining of the modal elastic property of the oscillator then is performed based on the vibration amplitude, the excitation signal and the modal quality.

5. The method of claim 4, wherein the determining of the modal quality of the oscillator is further based on the resonance frequency of the oscillator.

6. The method of claim 1, further comprising determining a variation in the modal elastic property of the oscillator by comparison with at least one reference value of the modal elastic property.

7. The method of claim 1, wherein the mass flow meter is characterized by a calibration factor, which serves to determine a mass flow measurement value which is proportional to the calibration factor and to a time difference between in-phase points of the signals of two vibration sensors of the meter, and wherein the method further comprises adapting the calibration factor depending on a variation in the modal elastic property of the oscillator.

8. The method of claim 7, further comprising:
sensing a series of values of the modal elastic property; and
determining a trend for the modal elastic property or a trend for the calibration factor.

9. The method of claim 8, further comprising:
determining a time period in which the modal elastic property or the calibration factor continues to lie within a permissible value range; and
signaling the time period, and/or outputting an alarm signal, if the time period falls below a limit value, wherein the time period is not less than one week.

10. The method of claim 9, wherein the time period is not less than eight weeks.

11. The method of claim 1, further comprising:
determining the modal elastic property of at least one further vibration mode; and
calculating a current relationship between the modal elastic property of the first antisymmetric vibration mode and the modal elastic property of the at least one further vibration mode.

12. The method of claim 11, further comprising evaluating the current relationship between the modal elastic property of the first antisymmetric vibration mode and the modal elastic property of the at least one further vibration mode.

13. The method of claim 11, further comprising determining an extent and a type of wear of the at least one measurement tube of the oscillator based on the relationship between the modal elastic property of the first antisymmetric vibration mode and the modal elastic property of the at least one further vibration mode.

14. The method of claim 11, wherein the at least one further vibration mode comprises the first symmetric flexural vibration mode and/or the second symmetric flexural vibration mode.

15. The method of claim 1, wherein the modal elastic property comprises a modal flexural stiffness, a modal flexibility or a calibration factor.

* * * * *